United States Patent [19]
Watanabe

[11] 4,148,083
[45] Apr. 3, 1979

[54] REPRODUCING SYSTEM HAVING SCANNING TRANSDUCER MEANS WHICH ARE SELECTIVELY DEFLECTABLE TO AVOID TRACKING ERRORS

[75] Inventor: Yoshimi Watanabe, Yokohama, Japan

[73] Assignee: Sony Corporation, Tokyo, Japan

[21] Appl. No.: 826,199

[22] Filed: Aug. 19, 1977

[30] Foreign Application Priority Data

Aug. 20, 1976 [JP] Japan .................................. 51-99962

[51] Int. Cl.$^2$ ............................................. G11B 21/10
[52] U.S. Cl. ..................................................... 360/77
[58] Field of Search ...................... 360/77, 70, 75, 71, 360/76

[56] References Cited
U.S. PATENT DOCUMENTS

| | | | |
|---|---|---|---|
| 3,126,535 | 3/1964 | Streeter | 360/77 |
| 3,155,830 | 11/1964 | Knight | 250/201 |
| 3,501,586 | 3/1970 | Russell | 179/100.3 V |
| 3,544,718 | 12/1970 | Adler | 358/132 |

FOREIGN PATENT DOCUMENTS

| | | | |
|---|---|---|---|
| 49-20208 | 5/1974 | Japan | 360/77 |
| 49-84617 | 8/1974 | Japan | 360/77 |
| 52-43362 | 10/1977 | Japan | 360/77 |

*Primary Examiner*—John H. Wolff
*Attorney, Agent, or Firm*—Lewis H. Eslinger; Alvin Sinderbrand

[57] ABSTRACT

A reproducing system having a rotary magnetic head scanning video tracks recorded on a magnetic tape, a head deflector for deflecting the rotary magnetic head transversely to the tracks scanned, and a control circuit for supplying a control signal to the head deflector so that the rotary magnetic head scans the center of the video tracks. The control signal is produced by comparing the envelope of reproduced signals from the rotary magnetic head when one track is scanned with the envelope of reproduced signals when another track is scanned.

11 Claims, 26 Drawing Figures

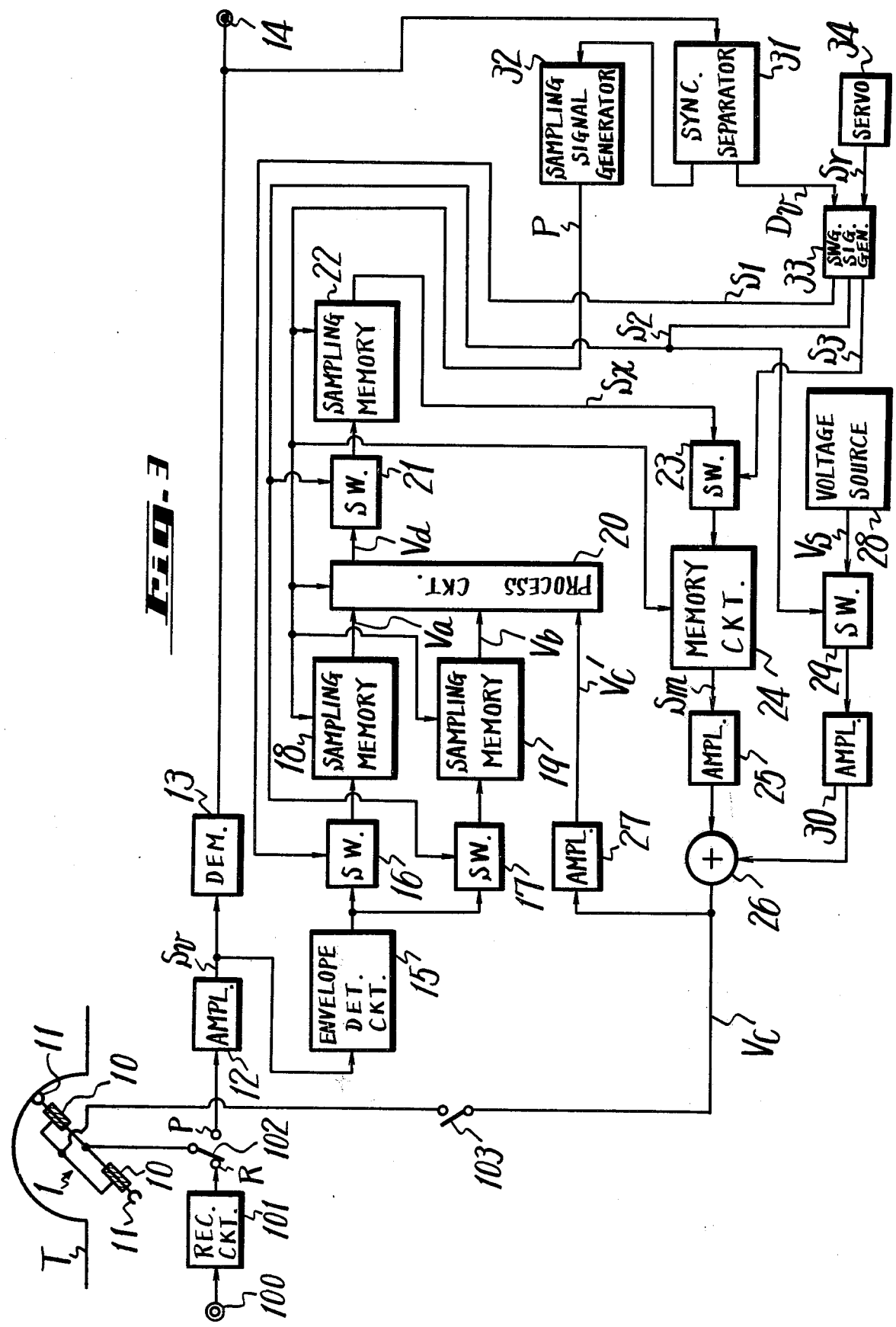

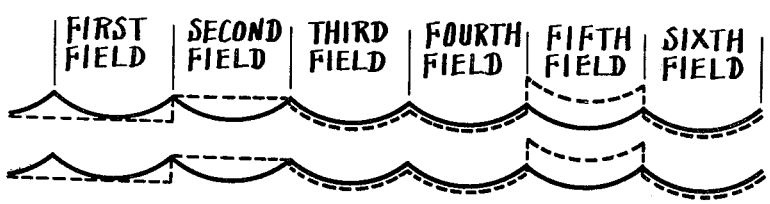
Fig. 4A
Fig. 4B (Sv)
Fig. 4C (Dv)
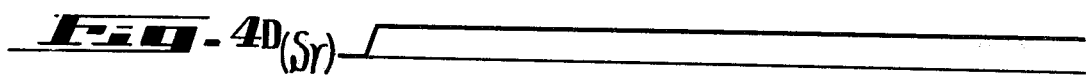
Fig. 4D (Sr)
Fig. 4E (S1)
Fig. 4F
Fig. 4G (S2)
Fig. 4H
Fig. 4I (Sx)
Fig. 4J (S3)
Fig. 4K (Sm)

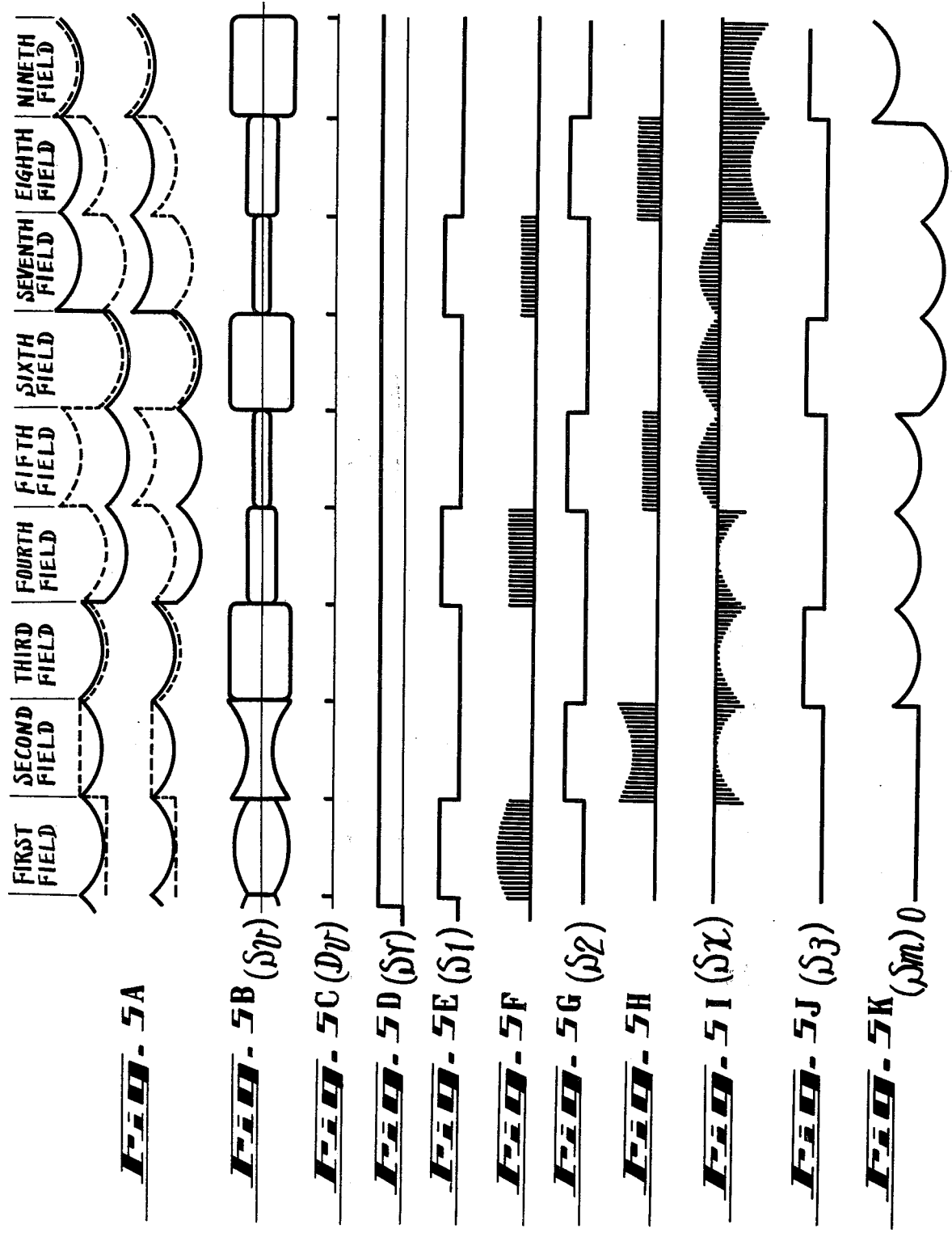

REPRODUCING SYSTEM HAVING SCANNING TRANSDUCER MEANS WHICH ARE SELECTIVELY DEFLECTABLE TO AVOID TRACKING ERRORS

BACKGROUND OF THE INVENTION

1. Field of the Invention

This invention relates generally to a reproducing system, and more particularly to a reproducing system which has an automatic head scan tracking system.

2. Description of the Prior Art

In general, in a video tape recorder (VTR) video signals are recorded in plural record tracks on a magnetic tape, which, tracks extend across the longitudinal direction of the tape and are arranged in parallel with one another with a predetermined distance between adjacent tracks.

In order to obtaining a high recording density with such a VTR, it is necessary to narrow the pitch of the recording tracks and also the width of each track. In such a case, if the normal rotation speed of a rotary magnetic head is selected, that is, a speed that is the same as that of an ordinary VTR, the tape transportation speed can be made low. Thus, long time recording becomes possible. If the tape transporation speed is selected to be the same as that of the ordinary VTR, then the rotation speed of the rotary magnetic head is made high, and wide frequency signals can be recorded. In this case, even if the width of recording tracks is made narrow, due to the fact that the signal-to-noise ratio S/N is less deteriorated, the overall quality of reproduced signals can be made high.

In fact, however, the recording tracks formed by the rotary magnetic head are not always straight and the linearity of recording tracks is deteriorated by the distortion of the tape caused by, for example, stretching of the tape and so on. Accordingly, when such recording tracks are scanned by the rotary magnetic head, a so-called tracking error is produced and hence the level of reproduced signals is varied. This defect becomes more noticeable as the track width becomes narrower.

For this reason, if the track width of the reproducing head is made greater than that of the recording head, the above defect can be removed. In this case, however, a possible disadvantage is that a signal is reproduced from an adjacent track and hence the quality of reproduced signals is deteriorated.

For this reason, a method has been proposed in which the rotary magnetic head is moved or displaced by an electromechanical transducer in the direction that is transverse to the longitudinal direction of the tape to carry out an automatic head scan tracking. With this method, a tracking error signal is provided by intentionally deflecting or displacing the magnetic head by a small amount in each direction from the track center in a sinusoidal manner so as to create a carrier amplitude modulation of a known frequency and phase. This tracking error signal is fed back to the transducer to complete a tracking servo loop. Accordingly, even if the recording tracks are curved, the reproducing head can scan the recording tracks. With this method, however, a carrier amplitude modulation is always created in the reproduced video signal, so that the phase of the reproduced video signal is changed thereby, and especially there is caused a phase error in the chrominance signal. Further, the apparatus for achieving the above method becomes complicated in construction.

OBJECTS AND SUMMARY OF THE INVENTION

An object of the invention is to provide a reproducing system comprising an automatic head scan tracking system which has less of an effect on the reproduced signal than the aforementioned method.

Another object of the invention is to provide a reproducing system which is used to reproduce from a tape signals which have been recorded with high density.

A further object of the present invention is to provide an improved recording system which has an improved automatic head scan system based upon the fact that the shapes of the recording tracks in the longitudinal direction are not so different from one another and that the shapes of the recording trakcs which are relatively near each other are substantially equal with one another.

According to an aspect of the present invention, the intentional deflection or displacement of the scanning magnetic head is carried out in only one direction from the track center. An error signal is obtained by comparing the signal which is reproduced from the deflected head being deflected with the signal which is reproduced from the non-deflected head. This error signal is stored, and a head-deflecting transducer is driven by the stored error signal during a fixed period.

Other objects, features and advantages of the invention will become apparent from the following description taken in conjunction with the accompanying drawings.

BRIEF DESCRIPTION OF THE DRAWINGS

FIG. 3 is a block diagram showing a circuit of the VTR to which the invention is applied;

FIGS. 4A to 4K are waveform diagrams used for explaining the VTR shown in FIG. 3; and FIGS. 5A to 5K are waveform diagrams similar to those of FIGS. 4A to 4K but different in position of recording tracks.

DESCRIPTION OF THE PREFERRED EMBODIMENTS

Figure 1A:
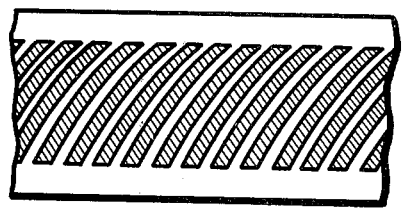
FIGS. 1A and 1B are top plan views showing examples of the patterns of recording tracks on tapes, respectively.
Figure 1B:
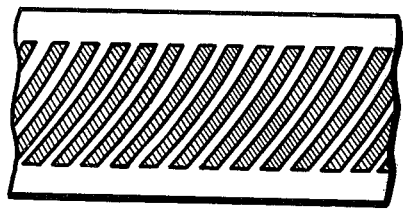

FIGS. 1A and 1B are top plan views of magnetic tapes on which different track patterns are formed by a known video tape recorder (VTR). As shown in FIGS. 1A and 1B, the track pattern is curved upwards or downwards, generally. Accordingly, when a magnetic tape having the track pattern such as shown in FIGS. 1A is reproduced by another VTR having a magnetic head which will carry out a scan or trace pattern such as shown in FIG. 1B, the level of the reproduced signal is changed in accordance the position of the head. As a result, a phase error is introduced into the reproduced signal, and especially in the case of reproducing a color video signal the color reproducibility is deteriorated.

The track is dependent on the particular VTR, and is seen to change significantly when one VTR is used for recording and a different VTR is used for reproduction. However, if the same VTR is used for both signal recording and reproducing, the record and trace patterns are changed so much. This invention proceeds on the recognition of the above fact.

Figure 2:
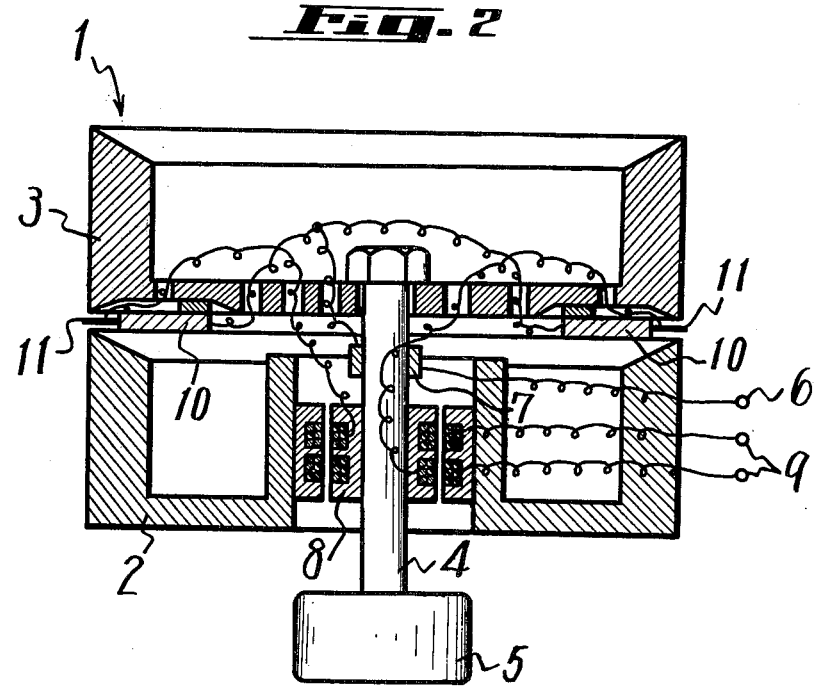
FIG. 2 is a cross-sectional view of an example of a rotary magnetic head assembly of a VTR to which the present invention is applicable.

An example of the present invention will be hereinafter described with reference to the drawings. FIG. 2 is a cross-sectional view showing an example of a rotary magnetic head assembly 1 of a VTR to which the present invention is applicable. The rotary magnetic head assembly 1 comprises a fixed lower drum 2, a rotary upper drum 3, a rotary shaft 4, and a servo motor 5 for driving rotary shaft 4. On a predetermined portion of the lower surface of upper drum 3 there are located head deflector elements 10 in such a manner that their longitudinal directions coincide with the diameter of rotary upper drum 3 and their displacement or moving direction is in the vertical or up-and-down direction, as viewed in FIG. 2. The end of each of head deflection elements 10 closer to rotary shaft 4 is fixed to upper drum 3 and the other end of each of elements 10 is provided with a magnetic head 11 such that the tip end of head 11 extends slightly beyond the outer peripheral surface of drum 3. Each of the head deflector element 10 could be an electromechanical transducer such as a piezo-electric plate, piezo-ceramic plate, bi-morph plate consisting of the above two plates bound together or the like.

The head deflector element 10 is supplied with a control voltage from an input terminal 6 through slip ring 7 provided, for example, around rotary shaft 4 so as to deflect in the up or down direction in response thereto. This has the effect of displacing the scan or trace position of head 11 either up or down. An output from head 11 is delivered through, for example, a rotary transformer 8 provided around rotary shaft 4 to output terminals 9.

A magnetic tape T (refer to FIG. 3) is wound around the outer periphery of the drums of head assembly 1 with an angular range of about 180° and is transported at a predetermined speed. Heads 11 are supplied with a video signal, for example, whose luminance signal is frequency-modulated and whose chrominance signal is converted to a low frequency band component and the heads record the video signal on tape T such that each one frame thereof forms one slant magnetic track. Further, the video signal is reproduced from the tracks by heads 11.

FIG. 3 is a connection diagram of the VTR in which the present invention is employed. With this VTR, in the recording mode the video signal applied to an input terminal 100 is supplied through a recording circuit 101 and a recording contact R of a record-reproduce (playback) change-over switch 102 to heads 11. At this time, a switch 103, which is used to supply a control voltage to head deflector elements 10, is turned OFF, so that no control voltage is applied to head deflector element 10. Thus, heads 11 assume predetermined positions to scan tape T at so as to form thereon magnetic tracks.

In the playback mode, the signal reproduced by head 11 is applied through a playback contact P of switch 102 and a head amplifier 12 to a reproducing circuit 13 which includes an FM demodulator and other processing circuitry. The demodulated video signal from reproducing circuit 13 is delivered to an output terminal 14. In addition the signal from head amplifier 12 is supplied to an envelope detect circuit 15. The detected signal from envelope detect circuit 15 is applied through switch circuits 16 and 17 to sampling memory circuits 18 and 19, respectively. The output signals from sampling memory circuits 18 and 19 are supplied to a process circuit 20 whose output signal is supplied through a switch circuit 21 to a sampling memory circuit 22. In this case, each of sampling memory circuits 18, 19 and 22 samples the input signals in response sampling pulses fed thereto and memorizes or stores the peak values of all the sampled signals. Further, from each of the sampling memory circuits the stored contents can be read out successively by the sampling pulses until a new input signal is applied thereto and stored therein. In this example, if desired a sampling circuit which has no memory function can be used as the sampling memory circuit 19.

The signal from sampling memory circuit 22 is supplied through a switch circuit 23, a memory circuit 24, an amplifier 25, an adding circuit or adder 26 and switch 103 to head deflector elements 10 of rotary magnetic head assembly 1 as a control signal $V_c$. Memory circuit 24 memorizes the signal applied thereto from sampling memory circuit 22 through switch circuit 23, reads out the memorized signal in response to the sampling pulses and delivers the read out signal as an integrated signal.

The signal from adding circuit 26 is applied through an amplifier 27 to process circuit 20. A desired DC voltage $V_s$ from a voltage source 28 is applied through a switch circuit 29 and an amplifier 30 to adding circuit 26. The signal from reproducing circuit or demodulator 13 is also fed to a sync. (synchronizing) separator 31. The horizontal synchronizing signal from sync. separator 31 is applied to a sampling signal generator 32. The reason why the horizontal sync. signal is derived is that since the level of the sync. tip in the recorded signals is always constant a trace error of heads 11 upon playback can be determined by examining the level of the sync. tip. The sampling pulse obtained from sampling signal generator 32 is supplied to sampling memory circuits 18,19,22 and memory circuit 24, respectively.

The vertical sync. signal from sync. separator 31 is fed to a switching signal generator 33 which produces switching signal $S_1$, $S_2$ and $S_3$. The switching signal from switching signal generator 33 are supplied to switch circuits 16, 17, 21 and 29, respectively. The servo locked signal from a servo circuit 34 is fed to switching signal generator 33. The servo locked signal is a signal which represents, for example, that the drum servo operates normally.

The operation of the circuit shown in FIG. 3 will be now explained with reference to FIGS. 4A to 4K. In FIG. 4A solid lines represent the shape of the track patterns on tape T. That is, the distance between the upper and lower sets of solid lines in FIG. 4A represents the track width. For example, when the head deflector elements 10 are not supplied with the control signal i.e. the output signal of adder 26, the heads 11 scan tape T along dotted lines in FIG. 4A during the first field. A description will be now given on the above case. When switching signal generator 33 is supplied with the servo locked signal $S_r$ (refer to FIG. 4D) from servo circuit 34 and with the vertical sync. signal $D_v$ (refer to FIG. 4C) from sync. separator 31, switching signal generator 33 produces switching signals $S_1$, $S_2$ and $S_3$ (refer to FIGS. 4E, 4G and 4J) sequentially. Switch circuit 29 is made ON by switching signal $S_2$, so that at this time predetermined DC voltage $V_s$ is applied from voltage source 28 to adder 26 and hence predetermined DC voltage $V_c$ is applied from adder 26 to head delfector elements 10. Accordingly, the heads 11 scan the trace pattern along the dotted lines in FIGS. 4A during first and second fields. During the first field the switching signal $S_1$ is fed to switch circuit 16 so that the signal with the envelope shown in FIG. 4B is fed from detector 15 through switch circuit 16 to sampling memory circuit 18. While, sampling signal generator 32 produces the sampling pulse P which corresponds to each horizontal sync. tip period of signal $S_y$ and which is fed to sampling memory circuit 18. Thus, the envelope signal of signal $S_y$ is sampled by sampling memory circuit 18 and then memorized or stored therein as the sampled value as shown in FIG. 4F. In FIG. 4F, the vertical or longitudinal lines represent the sampled values, respectively.

Next, during the second field switching signal generator 33 produces switching signal $S_2$ which corresponds to this period as shown in FIG. 4G. This switching signal $S_2$ is supplied to switch circuits 17, 21 and 29 to turn them ON, respectively. Thus, the predetermined voltage $V_c$ is supplied to head deflector elements 10 with the result that heads 11 scan the tape T along, for example, dotted lines in FIG. 4A. The envelope of the reproduced signal from the heads 11, which are deflected, is applied through switch circuit 17 to sampling memory circuit 19 the latter being supplied with sampling signal from sampling signal generator 32, so that the sampled value of the envelope of signal $S_y$ is memorized or stored, in sampling memory circuit 19 as shown in FIG. 4H. In this case, at the time when the first sampling operation is carried out in response to a sampling pulse P (e.g. pulse $P_1$), a level $V_{b1}$ of the sync. tip at this $S_2$ sampling time is supplied to process circuit 20 by sampling memory circuit 19, and a level $V_{a1}$ of the sync. tip at the first sampling time ($P_1$) in the first field, which is stored in sampling memory circuit 18, is read out therefrom and fed to process circuit 20. The process circuit is also supplied with control signal, or DC voltage $V_c$ from adder 26. Thus, the following process is achieved in process circuit 20.

$$V_{d1} = V_{a1} - V_{b1} - V_{c'}$$

where $V_{c'}$ is a signal derived from the reproduced output of heads 11 when control signal $V_c$ applied to head deflector elements 10 and is expressed by $V_{c'} = f(V_s, S_m)$, where $S_m$ will be described below. In the second field $S_m$ is zero. The result $V_{d1}$ from process circuit 20 is then fed through switch circuit 21 to sampling memory circuit 22 to be stored therein. Thereafter, a similar process is carried out during each sync. tip period in the second field by the next following sampling pulses $P_2$, $P_3$ ... and the results $V_{d2}$, $V_{d3}$, $V_{d4}$, ... are stored in sampling memory circuit 22 in this order. Accordingly, in sampling memory circuit 22 there is stored a signal $S_x$ whose level is varied in accordance with the shift or displacement between heads 11 and the record tracks as shown in FIG. 4I.

During the third field the switching signal $S_3$ shown in FIG. 4J is applied from switching signal generator 33 to switch circuit 23 to turn it ON. As a result, signal $S_x$ from sampling memory circuit 22 is fed through switch circuit 23 to memory circuit 24 which produces a signal $S_m$ shown in FIG. 4K. This signal $S_m$ is fed through amplifier 25 and adder 26 to head delfector elements 10 as control signal $V_c$ to move heads 11 such that they are shifted up and down along paths which vary as a zigzag line. Thus, the first correction operation is finished.

The second correction operation is achieved in fourth to sixth fields. Since head deflector elements 10 have been supplied with control signal $V_c$ during the first correction operation (particularly the third field), if the record track pattern is the same in the fourth to sixth fields as that of the first three fields as shown in FIG. 4A, heads 11 trace the record track pattern correctly during the fourth field. Accordingly, during the fourth field a sampled signal with a constant level is stored in sampling memory circuit 18 as shown in FIG. 4F. During the fifth field, control signal $V_c$, which is formed by adding signal $S_m$ from memory circuit 24 to DC voltage $V_s$ from voltage source 28, as fed through switch circuit 29, is supplied to head deflector elements 10, so that heads 11 achieve such a trace as shown in FIG. 4A. Accordingly, the sampled signal having a constant level, which is different from the level of the sampled signal stored in sampling memory circuit 18, is stored in sampling memory circuit 19 as shown in FIG. 4H. A process similar to that expressed by the above expression is achieved in process circuit 20 and hence a sampled signal $S_x$ with a waveform similar to that of the previous signal $S_x$ is stored in sampling memory circuit 22. This signal $S_x$ is fed through switch circuit 23 to be stored in memory circuit 24 when switching signal $S_3$ is applied to switch circuit 23. As a result, from the sixth field, the signal $S_m$ from memory circuit 24 is fed to head deflector elements 10 as the control signal $V_c$ to continue the correct tracking operation.

FIGS. 5A to 5K show the case where the position of the recording tracks has been changed at the times of the second and third correction operations. That is, during the fourth to sixth fields the position fo the recording tracks differs from the position thereof during the first to third fields, and the position of the recording tracks during the seventh to ninth fields differs from the positions thereof during the first to sixth fields as shown in FIG. 5A. It will be apparent that the control signal $V_c$ is provided in accordance with the same operation as described above, so that another detailed description thereon will be omitted for the sake of brevity.

The above description has assumed that the curve of the recording track is not changed. However, even if the curve is changed, it will be apparent that the appropriate control signal $V_c$ is provided by the same aforedescribed operation.

Further, in the previously discussed example all the sync. tips are measured but it is possible to reduce the number of sync. tips which are measured. That is, it is sufficient to achieve the sync. tips sampling operation at the first, middle and last portions of at least one track.

Also, in the above mentioned example the envelope signal is sampled by sampling sync. tips and then the sampled sync. tips are compared, but there is a correlation between the video signals in adjacent tracks so that a track can be sampled at any desired portion. Further, when an analog memory circuit is employed it is possible that the envelope signals themselves can be compared to produce an error signal.

Further, it is unnecessary to always repeat the above correction operation at every three fields. If it is possible to detect that the correct trace is achieved, it is sufficient thereafter to achieve one correction operation per several fields or several hundred fields. Since an automatic gain control (AGC) operation is carried out if the correct trace is achieved, a track shift or displacement by about 10 to 20% has no effect on the reproduced picture. Accordingly, if a correct trace is obtained once, then the correction operation after the following this correct trace can be carried out by about 10 to 20% of DC bias with, no flicker.

Further, if the amount of one correction is selected to be smaller than 10% of the amount of the detected error, then there will be no hunting and hence correction can be achieved smoothly.

With the system of the invention, even a zigzag track can be traced correctly. Accordingly, the width of tracks can be reduced and hence the recording density can be increased, so that the quality of the reproduced picture is enhanced or if desired long recording and/or reproduction become possible.

In this invention a constant or predetermined DC voltage is used to intentionally deflect the head deflector elements, so that the reproduced signal is not amplitude-modulated and hence no phase error is caused in the reproduced signal. Thus, no hue error is caused if the invention is used in the reproduction of a color video signal.

The above description has assumed that the present invention is applied to a VTR, but the present invention is applicable to the reproduction of a video signal, from a magnetic sheet.

Further, as the sampling memory circuit, BBD (bucket brigade device), CCD (charge coupled device), digital memory circuit or the like can be used.

It will be apparent that many modifications and variations could be effected by one skilled in the art without departing from the spirit or scope of the novel concepts of the present invention, so that the scope of the invention should be determined by the appended claims only.

I claim as my invention:

1. A reproducing system for reproducing signal from a record medium, which signals are recorded in successive, parallel tracks, comprising:
   at least one transducer means movable relative to said record medium to scan said successive parallel tracks in respective scanning paths for reproducing said recorded signals;
   drive means for driving said transducer means along said respective scanning paths;
   deflecting means for coupling said transducer means to said drive means, said deflecting means being responsive to a deflection control signal for deflecting the transducer means coupled thereto in a direction transversely to the longitudinal direction of the track being scanned so as to deflect said scanning path of said transducer means;
   means for supplying a constant deflection control signal component to said deflecting means when said transducer means scans predetermined ones of said tracks so as to deflect said transducer means by a predetermined amount;
   means for detecting a first envelope of the signals reproduced by said transducer means when said transducer means scans said predetermined ones of said tracks;
   means for detecting a second envelope of the signals reproduced by said transducer means when said transducer means scans predetermined other tracks;
   comparing means for comparing said first envelope to said second envelope to produce an error signal;
   storage means for storing said error signal; and means for supplying said stored error signal to said deflecting means as a deflection control signal when said transducer means scans selected tracks.

2. A reproducing system as claimed in claim 1 further comprising switch control signal generating means for generating a first switch control signal whenever said transducer means scans a predetermined one track, a second switch control signal whenever said transducer means scans a predetermined other track, and a third switch control signal whenever said transducer means scans a selected track; and wherein said means for detecting a first envelope comprises first switch means responsive to said first switch control signal for passing the envelope of the signal reproduced by said transducer means, and said means for detecting a second envelope comprises second switch means responsive to said second switch control signal for passing the envelope of the signal reproduced by said transducer means.

3. A reproducing system as claimed in claim 2 wherein said comparing means comprises a source of sampling signals synchronized with predetermined synchronizing signals included in said recorded signals; first sampling means responsive to said sampling signals for storing and reading out the envelope of the signal passed thereto by said first switch means; second sampling means responsive to said sampling signals for storing and reading out the envelope of the signal passed thereto by said second switch means; and a processing circuit for comparing each sample of the envelope read out by said first sampling means to each sample of the envelope read out by said second sampling means.

4. A reproducing system as claimed in claim 3 wherein said storage means comprises third switch means responsive to said first switch control signal for passing the output of said processing circuit; and third sampling means responsive to said sampling signals for storing and reading out the output passed thereto by said third switch means.

5. A reproducing system as claimed in claim 4, wherein said means for supplying said stored error signal to said deflecting means comprises fourth switch means responsive to said third switch control signal for passing each signal read out by said third sampling means; memory circuit means for storing the signals passed by said fourth switch means and responsive to said sampling signals for reading out the signals stored therein; and combining means for combining the signals read out by said fourth switch means with said constant deflection control signal component to produce said deflection control signal.

6. A reproducing system as claimed in claim 5, further comprising means for applying said deflection control signal to said processing circuit, and wherein said processing circuit performs the function $V_d = V_a - V_b - V_c$, with $V_d$ being the output of said processing circuit, $V_a$ being the output of said second sampling means, $V_b$ being the output of said first sampling means, and $V_c$ being a function of said deflection control signal.

7. A reproducing system as claimed in claim 1, wherein said deflecting means is an electromechanical transducer.

8. A reproducing system as claimed in claim 7, wherein said electromechanical transducer is a piezoelectric plate.

9. A reproducing system as claimed in claim 7, wherein said electromechanical transducer is a piezoceramic plate.

10. A reproducing system as claimed in claim 1, wherein said comparing means includes signal sampling means for sampling said first and second envelopes.

11. A reproducing system as claimed in claim 10, wherein said signal sampling means samples a signal applied thereto at least three times during the period when said transducer means scans one of said recording tracks.

* * * * *